United States Patent [19]
Levinson et al.

[11] Patent Number: 5,956,168
[45] Date of Patent: Sep. 21, 1999

[54] MULTI-PROTOCOL DUAL FIBER LINK LASER DIODE CONTROLLER AND METHOD

[75] Inventors: Frank H. Levinson, Palo Alto; William R. Freeman, Castro Valley; Daniel S. Kane, San Francisco; Minh Q. Vu, San Jose, all of Calif.

[73] Assignee: Finisar Corporation, Mountain View, Calif.

[21] Appl. No.: 08/924,852

[22] Filed: Sep. 5, 1997

Related U.S. Application Data

[63] Continuation-in-part of application No. 08/911,127, Aug. 14, 1997.

[51] Int. Cl.$^6$ .................................................. H04B 10/00
[52] U.S. Cl. ........................................ 359/152; 359/113
[58] Field of Search ................................. 359/152, 173, 359/188, 195, 110, 113

[56] References Cited

U.S. PATENT DOCUMENTS

| | | |
|---|---|---|
| 5,136,410 | 8/1992 | Heiling et al. ........................... 359/110 |
| 5,469,285 | 11/1995 | Gut ........................................... 359/152 |
| 5,706,278 | 1/1998 | Robillard et al. ....................... 370/222 |

*Primary Examiner*—Kinfe-Michael Negash
*Attorney, Agent, or Firm*—Pennie & Edmonds, LLP

[57] ABSTRACT

A dual optical fiber transceiver, for use with first and second optical fibers, includes a laser transmitter for transmitting laser light into the first optical fiber, a laser light receiver for receiving laser light from the second optical fiber, and a controller coupled to the laser transmitter and laser light receiver. The controller includes a multi-protocol state machine for establishing the full duplex connection whenever the other device operates in compliance with either (A) a predefined "on-off-on" signaling protocol for establishing full duplex connections, or (B) a second predefined signaling protocol for establishing full duplex connections. In a preferred embodiment, the predefined "on-off-on" signaling protocol is the Open Fiber Control (OFC) protocol and the second predefined signaling protocol is a standard "laser transmitter always on" protocol. In the preferred embodiment, the multi-protocol state machine disables operation of the laser transmitter whenever a loss of light condition is detected by the transceiver's laser light receiver that is not in compliance with the OFC protocol.

14 Claims, 6 Drawing Sheets

MULTI-PROTOCOL DUAL FIBER LINK LASER DIODE CONTROLLER AND METHOD

This application is a continuation-in-part of U.S. patent application Ser. No. 08/911,127, filed Aug. 14, 1997.

The present invention relates generally to dual fiber communication links used for high bandwidth full duplex communications, and particularly to a controller for a laser diode transceiver that is compatible with dual fiber link modules using the "open fiber control protocol" (OFC protocol) and standard modules that do not use the OFC protocol.

BACKGROUND OF THE INVENTION

Referring to FIG. 1, the present invention relates to dual optical fiber communication systems. Generally, a dual optical fiber communication system 50 consists of two dual optical fiber transceivers 52 that exchange signals or data via a pair of optical fibers 54. Each of the two optical fibers 54 transmits data in a different respective direction. The system 50 provides full duplex communications between a pair of host devices 56, which are typically computers but may also be other types of devices, such as network hubs, network switches, computer or microprocessor controlled devices, and computer assisted devices.

Dual optical fiber communication systems, such as the system 50 shown in FIG. 1, are closed systems (i.e., there are no accessible laser emissions) during normal link operating conditions. It is only during maintenance and service conditions when the optical path is accidentally or purposefully broken that access to laser emissions is possible. In other words, if either of the optical fibers 54 is broken or removed from its respective terminal of one of the transceivers 52, laser light may be emitted outside the optical fibers.

The Electrotechnical Commission (IEC) 825 laser standard specifies requirements for a laser product to be classified as a "Safety Class 1" product. This standard defines a maximum allowed level of laser emissions.

The open fiber control protocol (OFC protocol), developed by IBM Corporation, and the subject of U.S. Pat. No. 5,136,410, is a technique for establishing a communication link between two dual fiber communication modules. U.S. Pat. No. 5,136,410 is hereby incorporated by reference as background information. If the two modules are properly interconnected by a pair of optical fibers, communications are established after the two modules exchange a predefined "on-off-on" sequence of pulses. If there are any breaks in the optical communication paths, the laser pulses on the broken path or paths are of sufficiently short duration and average power to meet the strict laser safety standards of a Safety Class 1 product. The repetitive pulse technique used by the OFC protocol reduces the average intensity of laser emissions into the environment in the vicinity of any break in the optical communication path because the laser transmitter is turned on less than 5% of the time whenever an open link condition exists.

The OFC protocol is the subject of ANSI standard X3T11 FC-PH Rev. 4.3.

Standard dual fiber link communication modules, which do not use the OFC protocol, simply turn on their laser transmitter (which is a laser diode) as long as the module is powered on. Standard modules do not attempt to turn off the transmission laser if a complete round trip communication path is not established. However, in most standard module implementations, the host device will not attempt to transmit data on the outgoing optical fiber unless the module detects the receipt of light from the device, if any, on the other end of the dual optical fiber communication channel. Thus, the "standard module protocol" is to always turn on the module's laser transmitter when the module is powered on, but to enable data transmission only when a full duplex connection is established, as indicated by the receipt of light at the module's optical receiver.

While the OFC protocol is an effective technique for meeting the Safety Class 1 product standard, new versions of the standard dual fiber link communication module also meet the Safety Class 1 product standard, even though they continuously transmit laser light when a round trip communication path has not been established. In particular, the new version of the standard module uses very sensitive photo diode receivers, which in turn enables the use of low power laser diode transmitters. Typical laser diode transmission power in such standard modules is approximately 0.25 milliwatt (and the maximum laser transmission power for such devices is approximately 0.4 milliwatt), while typical laser diode transmission power in OFC compliant modules (i.e., communication modules using the OFC protocol) is approximately 0.7 to 1.0 milliwatt. By using laser diode transmitters with such low output power, these standard dual fiber link communication modules meet the Safety Class 1.

The new, low power, standard dual fiber link communication modules are in widespread use, and are incompatible with OFC compliant modules. In other words, an OFC compliant module cannot establish a communication link with a standard module. Given the widespread use of both standard modules and OFC compliant modules, their incompatibility is inconvenient to the vendors of optical fiber communication services, the vendors of optical fiber communication products, as well as to end users who find that new optical fiber communication channels often don't work on the first try due to the use of incompatible communications modules on the two ends of the channel.

It is a goal of the present invention to provide a dual fiber link communication module that is compatible with both OFC compliant modules and standard modules.

Another goal of the present invention is to provide a dual fiber link communication module that meets the Safety Class 1 product standard. That is, the communication module should meet the Safety Class 1 product standard when the other end of the dual optical fiber communication channel is connected to a standard module, an OFC compliant module, another other device, or no device at all.

SUMMARY OF THE INVENTION

In summary, the present invention is a dual optical fiber transceiver for use with first and second optical fibers. The transceiver includes a laser transmitter for transmitting laser light into the first optical fiber, a laser light receiver for receiving laser light from the second optical fiber, and a controller coupled to the laser transmitter and laser light receiver. The controller includes a multi-protocol state machine for establishing the full duplex connection whenever the other device operates in compliance with either (A) a predefined "on-off-on" signaling protocol for establishing full duplex connections, or (B) a second predefined signaling protocol for establishing full duplex connections.

In a preferred embodiment, the predefined "on-off-on" signaling protocol is the Open Fiber Control (OFC) protocol and the second predefined signaling protocol is a standard "laser transmitter always on" protocol. In the preferred embodiment, the multi-protocol state machine disables operation of the laser transmitter whenever a loss of light condition is detected on the transceiver's laser light receiver that is not in compliance with the OFC protocol.

The controller, under control of the multi-protocol state machine, repeatedly attempts to establish a full duplex connection with the other device (if any) connected to the other end of the communication channel formed by the two optical fibers in accordance with the predefined "on-off-on" signaling protocol, until a laser light signal is received by the laser light receiver. After the laser light signal is received by the laser light receiver, the controller waits for a loss of light condition to be detected by the laser light receiver within a predefined time period. If the loss of light condition is detected by the laser light receiver within the predefined time period, the controller continues to follow the OFC protocol for establishing a full duplex connection. Otherwise, if the loss of light condition is not detected by the laser light receiver within the predefined time period, the controller transitions to a predefined active state and enables operation of the laser transmitter.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
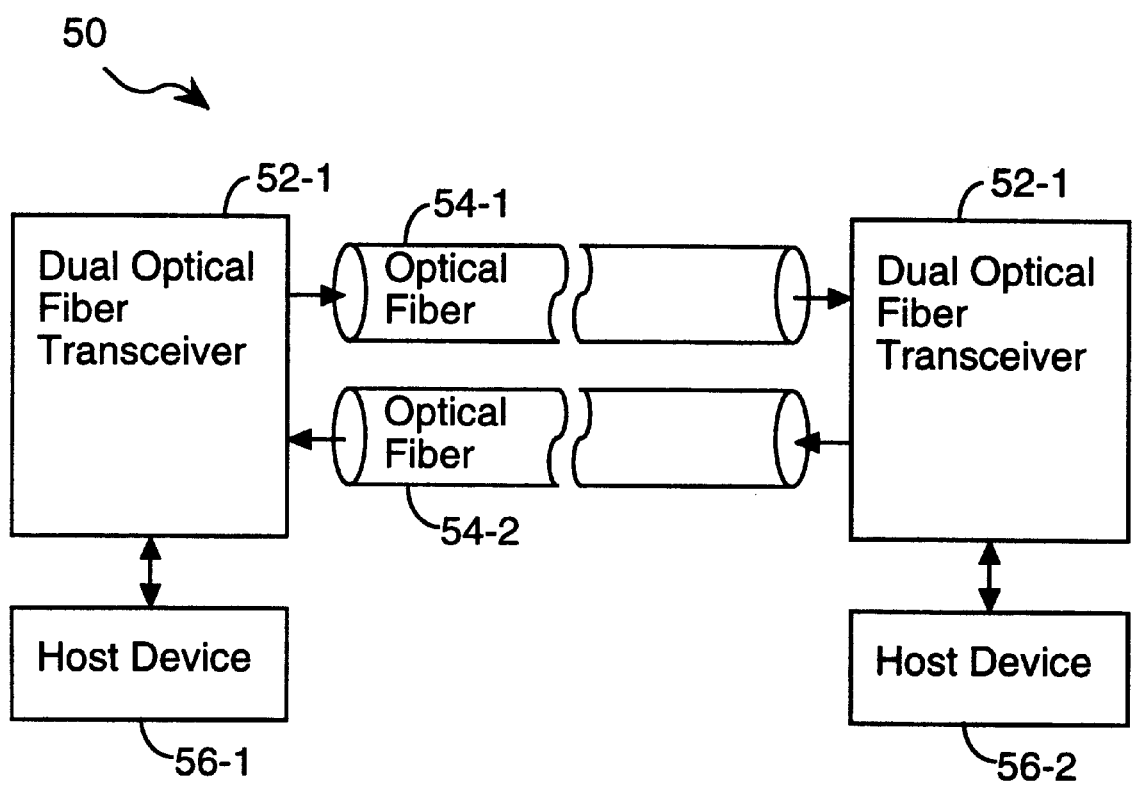
FIG. 1 is a block diagram of a dual optical fiber communication system.
Figure 2:
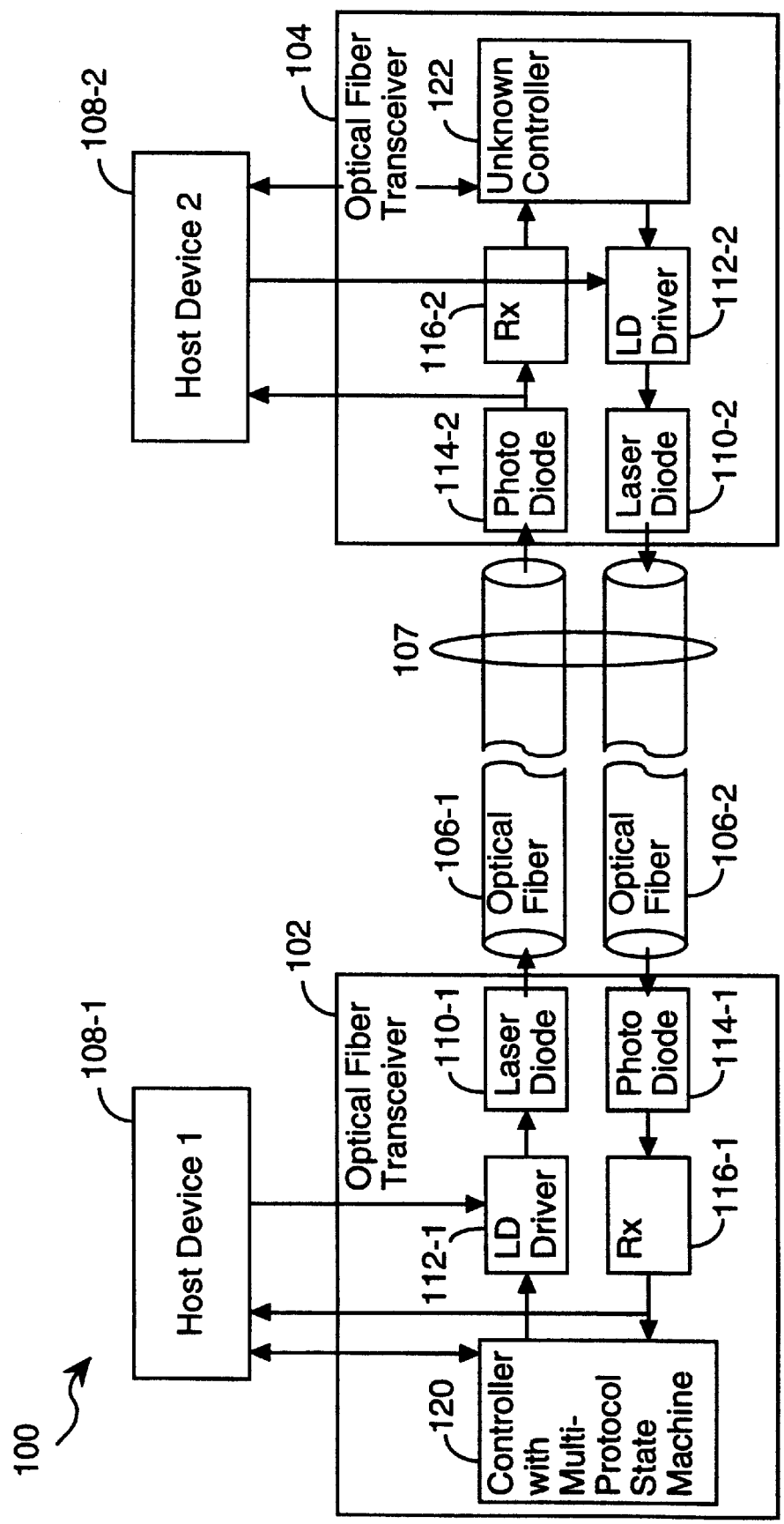
FIG. 2 is a block diagram of a dual optical fiber communication system incorporating a multi-protocol communication module in accordance with the present invention.

Referring to FIG. 2, there is shown a dual optical fiber communication system 100 that consists of two dual optical-fiber transceivers 102, 104 that exchange signals or data via a pair of optical fibers 106 that together form a full duplex communication channel 107. Each of the two optical fibers 106 transmits data in a different respective direction. The system 100 provides full duplex communications between a pair of host devices 108, which are typically computers but may also be other types of devices, such as network hubs, network switches, computer or microprocessor controlled devices, and computer assisted devices.

As will be described in more detail below, the transceiver 102 of the present invention is compatible with both OFC compliant transceiver modules and standard transceiver modules, and will establish a full duplex connection with either of these types of transceivers. As a result, when transceivers implementing the present invention are used in a network hub or switch, or any other device, the user does not need to determine whether the device on the other end of each dual optical fiber channel use an OFC compliant transceiver or a standard transceiver or even another transceiver implementing the present invention, because transceivers implementing the present invention are compatible with all three types of transceivers.

Each transceiver typically includes a laser diode (a laser light transmitter) 110 for transmitting laser light into one of the two optical fibers 106, and a laser diode driver circuit 112 for driving the laser diode with a controlled amount of power. In a preferred embodiment the power of the light transmitted by the laser diode is typically 0.25 milliwatt and preferably does not exceed 0.4 milliwatt. Each transceiver also typically includes a photo diode (a laser light receiver, also known as an optical receiver) 114 for receiving laser light from the other of the two optical fibers 106, and a receiver circuit for converting the received signal into a signal suitable for use by a controller 120, 122 and/or by the host device 108. Finally, each transceiver also typically includes a controller 120, 122. The controller 120 in the first transceiver 102 incorporates a preferred embodiment of the present invention, while the controller 122 of the second transceiver 104 contains a controller 122 of unknown type or no controller at all. For purposes of the present invention, it will be assumed that the controller 122 is either OFC compliant, or a standard module controller (which simply enables its laser diode transmitter 110 whenever the module is powered on).

Figure 3:
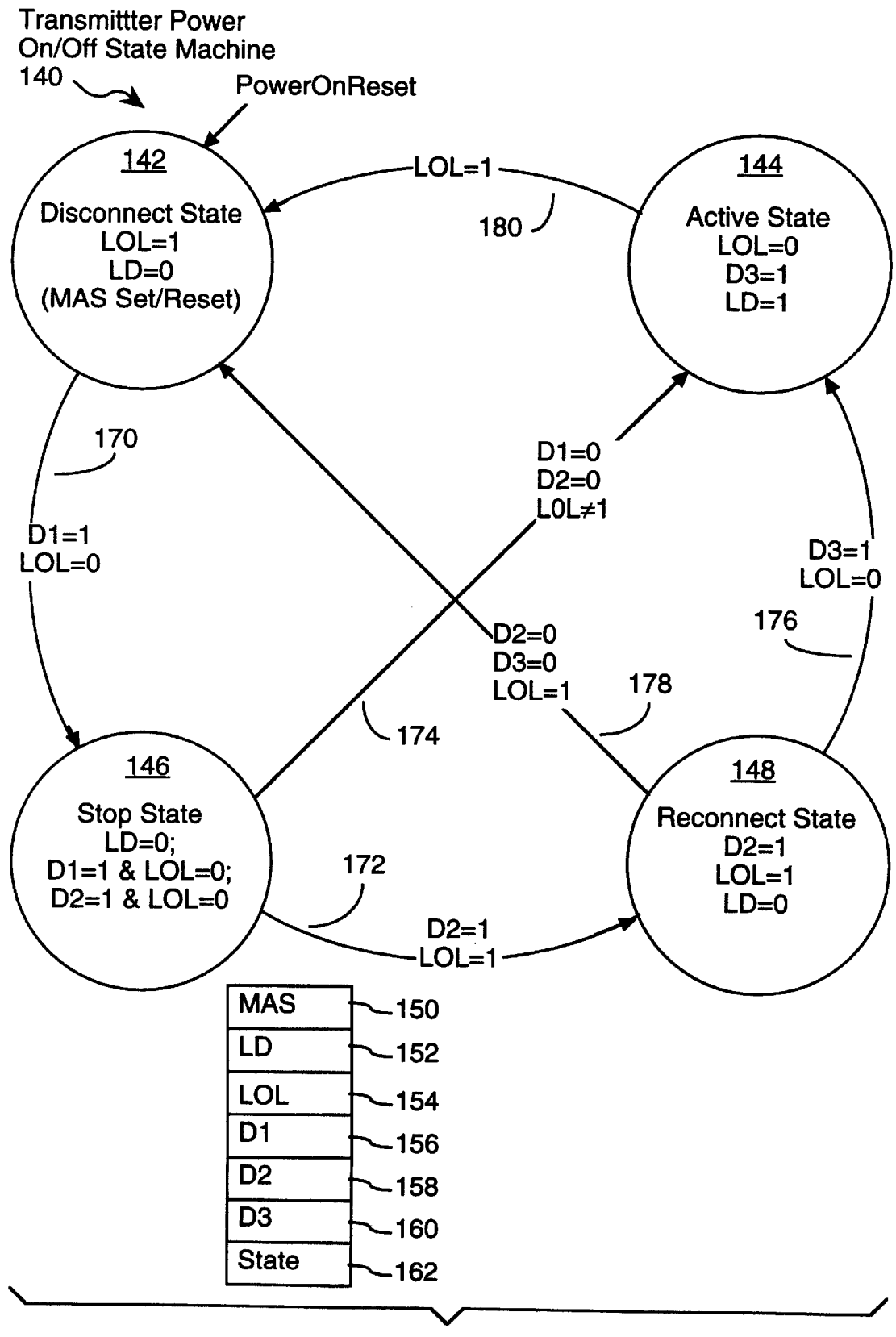
FIG. 3 is a state diagram for the state machine that governs operation of the multi-protocol communication module shown in FIG. 2 until the module establishes a communication link with another module.

When the dual optical fiber communication module 102 is first powered on, its controller 120 attempts to operate the module in accordance with the OFC protocol. However, if the module 104 at the other end of the dual optical fiber communication channel 107 is a standard module, then the controller 120 of module 102 switches to operation as a standard module. Referring to FIG. 3, a multi-protocol, transmitter power on/off state machine 140 in the controller 120 controls the operation of the module whenever (A) the module 102 is first powered on, and/or (B) the module has detected a "loss of light" condition on the inbound optical fiber 106-2 (indicating a broken or disconnected fiber condition or that the module on the other end of the communication channel 107 is powered off).

Multi-Protocol State Machine

The state machine 140, as shown in FIG. 3, has four states:

a disconnect state 142, which is the state of the controller when a communication link with another module has not been established and no light is being received on the inbound optical fiber 106-2;

an active state 144, which is the state of the controller after a communication link with another module has been established and this module's laser diode transmitter 110-1 is powered on;

a stop state 146, which is the state of the controller when a communication link with another module has not yet been established, and light has just begun to be received on the inbound optical fiber 106-2;

a reconnect state 148, which is the state of the controller when a communication link with another module has not yet been established, but the module on the other end of the communication channel 107 has performed the first two steps of the OFC protocol.

When the other module on the other end of the communication channel 107 is an OFC module, the state machine 140 proceeds counterclockwise from the disconnect state 140 to the stop state 146, then to the reconnect state 148 and finally to the active state 144, in that order. This will be explained in more detail below.

When the other module on the other end of the communication channel 107 is a standard module, the state machine 140 proceeds from the disconnect state 140 to the stop state 146, and then directly to the active state 144. Thus, the stop state 146 is the state at which the state machine determines whether the module at the other end of the communication channel 107 is an OFC compliant module or a standard module. This will also be explained in more detail below.

The state machine 140 maintains a set of internal parameters or variables that determine state transitions between the state of the state machine, as follows:

MAS (Master of Link flag) 150, which is equal to 1 if the module is the master module for purposes of establishing a communication link, and is equal to 0 if the module is the slave module;

LD (Laser Diode flag) 152, which is equal to 1 only when the laser diode is powered on for data communications, and is equal to 0 before a communication link has been established (the laser diode can be pulsed on briefly while LD is equal to 0);

LOL (Loss of Light) 154, which is equal to 1 whenever the module is not receiving laser light on its incoming optical fiber;

D1 (Decode 1 flag) 156 which is set equal to 1 when state machine is in the Disconnect State and light is received on the incoming optical fiber; D1 remains set to 1 while the transceiver transmits the first light pulse of the OFC protocol for a predefined length of time (e.g., 154 $\mu$s);

D2 (Decode 2 flag) 158 which is set equal to 1 when the state machine is in the Stop State and a loss of light (LOL) condition is detected; D2 remains set to 1 during a pause of predefined duration (e.g., 617 $\mu$s) between the first and second pulses of the OFC protocol;

D3 (Decode 3 flag) 160, which is set equal to 1 when the state machine is in the Reconnect state; D3 remains set equal to 1 while the transceiver transmits the second light pulse of the OFC protocol; and State 162, which is the variable that specifies the current state of the state machine.

The operation of the state machine 140 will next be explained for three different situations:

Case 1: when the multi-protocol module of the present invention interoperates with a module (i.e., at the other end of the communication channel 107) using the OFC protocol;

Case 2: when the multi-protocol module of the present invention interoperates with a standard module; and Case 3: when the multi-protocol module of the present invention interoperates with another multi-protocol module of the present invention.

The OFC protocol, as implemented by the transceiver of the present invention, involves the sending and receiving of an "On-Off-On" signal pattern. That is, the device on each end of the communication channel 107 sends the other an "On-Off-On" laser light signal pattern. More specifically, each device transmits a laser light pulse of approximately 154 $\mu$s (called the Decode 1 period), followed by an off period of approximately 617 $\mu$s (called the Decode 2 period), followed by the transmission of laser light for a period of at least 154 $\mu$s (called the Decode 3 period).

The "standard protocol" used by standard modules is to simply turn on their laser diode transmitters whenever the module is powered on.

The transceiver module of the present invention attempts to execute the OFC protocol, but transitions to the standard protocol when it receives a steady state laser light signal on the incoming optical fiber (i.e., on its receiver port). Thus, in Cases 1 and 3 (see listing of Cases 1–3, above), the OFC protocol is performed and a connection is established with the device at the other end of the communication channel after the full OFC "On-Off-On" signal pattern or protocol has been performed. In Case 2, the transceiver attempts to perform the OFC protocol, but switches to the standard protocol when it fails to detect an "Off" signal pattern from the device at the other end of the communication channel.

The transceiver module of the present invention starts up in the Disconnect State 142. If both devices on the two ends on the communication channel 107 are OFC compliant, then one will be the first to transmit a 154 $\mu$s pulse to the other, and becomes the OFC sequence master (MAS=1) and the other becomes the slave (MAS=0). The two modules complete the OFC protocol, progressing through the Stop, Reconnect and Active states, and then operate with their laser diode transmitters on until a fiber is broken or removed from one of the modules at which point the state machine 140 transitions to the Disconnect State and both modules turn off their respective laser diode transmitters. If either module is powered off, the other turns off its respective laser diode transmitter.

The MAS flag 150 is used to ensure that if a transceiver is the responding (i.e., slave) device, rather than the initiating (i.e., master) device in an OFC protocol exchange while in the Disconnect State, then it must also be the responding and not the initiating device during the Reconnect State exchange.

In the Disconnect State 142, the transceiver's laser is activated for only a first pulse time, called the Decode 1 period (preferably 154 $\mu$s), once every T seconds (preferably 10.1 seconds) to check for a closed optical link between itself and the device at the opposite end of the optical fiber link. As long as the module's LOL flag remains asserted (i.e., LOL=1, indicating light is not being received on the incoming optical fiber), the state machine remains in the Disconnect State 142.

To exit from the Disconnect State 142, light must be both sent and received by the transceiver 102. This send/receive exchange can occur in two ways.

1) If the internal 10.1 second timer expires before the transceiver receives an optical signal from the device at the other end of the communication channel 107, then this transceiver's state machine asserts its D1 and MAS flags and activates its laser for the duration of the Decode 1 period (preferably 154 $\mu$s). If during this Decode 1 period an optical signal is received by the transceiver from the device at the other end of the communication channel 107, as indicated by the LOL signal being set to 0, then the state machine transitions to the Stop State (via state transition path 170) for the remainder of the Decode 1 period. The asserted MAS flag indicates that this transceiver initiated the link reconnection sequence by sending light first and receiving light second. This transceiver is considered to be the master of the connection attempt.

2) If an optical signal is received (as indicated by LOL=0) from a device at the other end of the communication channel 107 during the 10.1 waiting period, then the 10.1 second timer is reset, the D1 signal is asserted (D1=1), the MAS flag is deasserted (MAS=0), and the laser diode is activated for the duration of the Decode 1 period (i.e., 154 $\mu$s). The state machine transitions to the Stop State. The MAS=0 flag indicates that this transceiver is the slave of the connection attempt.

The Stop State 146 is used for detecting the "off" portion of the "on-off-on" reconnect signal pattern. In the Stop State the transceiver turns off its laser diode after the laser has finished transmitting an "on" pulse for the Decode 1 period. When the Decode 1 period ends, the laser diode is turned off, and D1 is deasserted (D1=0). The transceiver turns off the laser diode for a time interval equal to the Decode 2 period (preferably 617 $\mu$s), and the D2 flag is asserted (D2=1) while the laser diode is turned off.

There are two exit paths from the Stop State 146:

1) When light on the incoming optical fiber is no longer detected (LOL=1) while D2 is active (indicating that this transceiver is also not transmitting light), the state machine transitions to the Reconnect State 148 (via state transition path 172). The transceiver continues to not transmit laser light for the remainder the Decode 2 time period, even after transitioning to the Reconnect State.

2) If light continues to be received on the incoming optical fiber (LOL=0) after the Decode 1 and Decode 2 periods both expire, D2 is deasserted (D2=0), and the state machine transitions directly from the Stop State to the Active State 144 via state transition path 174. The controller transitions to the Active State because the continued transmission of light by the device on the other end of the optical fiber communication channel 107 indicates that it is probably a standard transceiver module.

The Reconnect State 148 is used by the OFC protocol to verify that a closed link exists between two devices by once again requiring that an optical signal be both sent and received during a Decode 3 time period. In this state the function of the master and slave transceivers are different. If the transceiver 102 of the present invention is the slave, because it responded to an optical signal in the Disconnect State (i.e., MAS=0), it is important that it also responds in the Reconnect State and does not attempt to initiate the Reconnect send/receive exchange. When the transceiver's state machine enters the Reconnect State 148, D2 is deasserted (D2=0), but the transceiver continues to keep its laser diode transmitter disabled until the Decode 2 time period expires. The state machine leaves the Reconnect State 148 in one the following two ways:

1) If the transceiver is the master of the connection attempt (MAS=1), D3 is asserted (D3=1) when the Decode 2 period expires and the laser diode transmitter is activated for the duration of the Decode 3 time period (preferably 154 $\mu$s). If during the Decode 3 time period an optical signal is received on the incoming optical fiber (i.e., D3=1 and LOL=0), then the state machine transitions to the Active State 144 by state transition path 176. Otherwise, when the Decode 3 time period ends, D3 is deasserted and the state machine transitions back to the Disconnect State 142 by state transition path 178. A transition back to the Disconnect State 142 indicates a failure to establish a closed link connection with the device, if any, at the other end of the communication channel 107.

2) If the transceiver is the slave of the connection attempt (MAS=0), the D3 is asserted (D3=1) when the state machine enters the Reconnection State, but the laser diode transmitter is not activated. The Decode 3 period is timed from the end of the Decode 2 time period. Note that the Decode 2 time period will typically not expire until the state machine 140 has been the Reconnect State for most of the Decode 2 time period. If an optical signal is received by the transmitter (LOL=0) while D3 is asserted, during the Decode 3 time period, then the transceiver activates its laser diode transmitter in order to send a response, and transitions to the Active State 144 via state transition path 176. Otherwise, when the Decode 3 time period expires, D3 is deasserted (causing both D2=0 and D3=0), and the state machine transitions back to the Disconnect State 142 by state transition path 178.

The Active State 144 is the normal state for point to point data communications. The LD flag is asserted, enabling the laser diode transmitter to function continuously in this state. The transceiver continuously monitors its receiver(s) for a loss of light condition. If a loss of light condition is detected, the laser diode transmitter is disabled, the LOL flag is asserted (LOL=1), and the transceiver transitions to the Disconnect State 142.

As should be clear from the above discussion, when two transceivers implemented in accordance with the present invention are used on both ends of a dual optical fiber communication channel 107, the transceivers use the "on-off-on" OFC protocol to establish a connection.

The transceiver of the present invention is not fully OFC compliant in that a fully OFC compliant module will transition from the Stop State to the Disconnect State when the device at the other end of the communication channel fails to execute the "off" portion of the OFC signal pattern, whereas the transceiver of the present invention transitions directly to the Active State 144 in this circumstance. If the device at the other end of the communication channel 107 is not a standard module, but in fact is an OFC compliant module executing the D3 portion of its OFC protocol when this transceiver enters the Stop State 146 (indicating the two devices have gotten out of synchronization with each other), the other device will detect the "off" signal from this transceiver and shut off its laser diode transmitter in response, which, in turn, will cause this transceiver to transition back to the Disconnect State. Therefore, neither device leaves its laser diode transmitter on for very long when the two devices fail to establish a connection.

Hardware Implementation of Transceiver Controller

Figure 4:
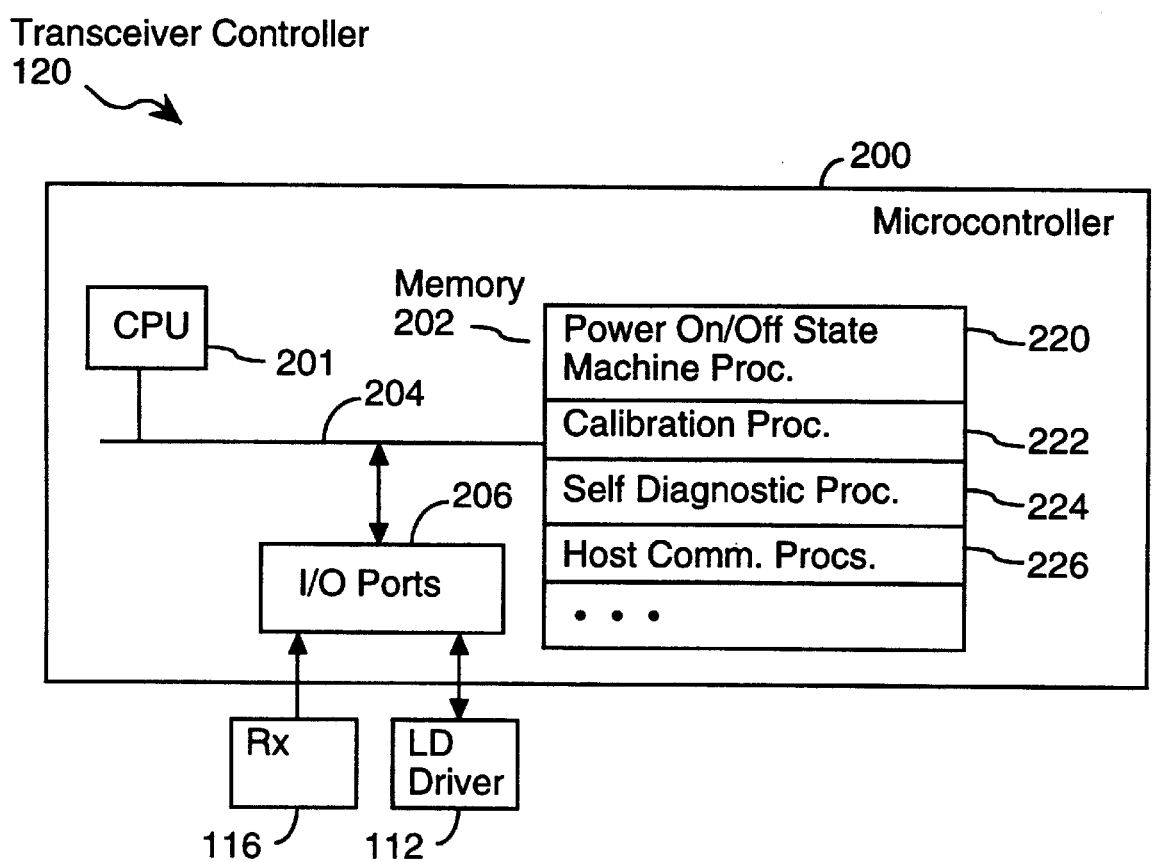
FIG. 4 is a block diagram of the circuitry for implementing the controller of the multi-protocol communication module shown in FIG. 2.

Referring to FIG. 4, in a preferred embodiment the transceiver controller 120 is implemented using a microcontroller 200 (e.g., a MC68HC705P9 microcontroller made by Motorola). The microcontroller 200 includes a microprocessor (CPU) 201 that executes a set of programs stored in memory 202 (which will typically include both non-volatile memory, such as read only memory or flash memory, and random access volatile memory). An internal memory bus 204 interconnects the microprocessor 201 and memory devices 202, and also connects a set of I/O ports 206 to the microprocessor 201. The I/O ports 206, in turn, couple the laser diode driver module 112 and receiver circuitry 116 to the microprocessor 201 (for turning the laser diode transmitter on and off, and for detecting the loss of light condition).

The programs stored in the memory devices 202 preferably include:

a laser diode power on/off state machine procedure 220 for implementing the multi-protocol state machine 140 described above with respect to FIG. 3;

a laser diode power calibration procedure 222 for setting the power level of the laser diode for data communications (which is typically set at approximately 0.25 milliwatt in a preferred embodiment);

a self diagnostic procedure 224 for determining whether the transceiver is functioning properly; and host communication procedures 226 for receiving commands and transmitting responses from and to a host device.

Alternate Embodiments

Figure 5:
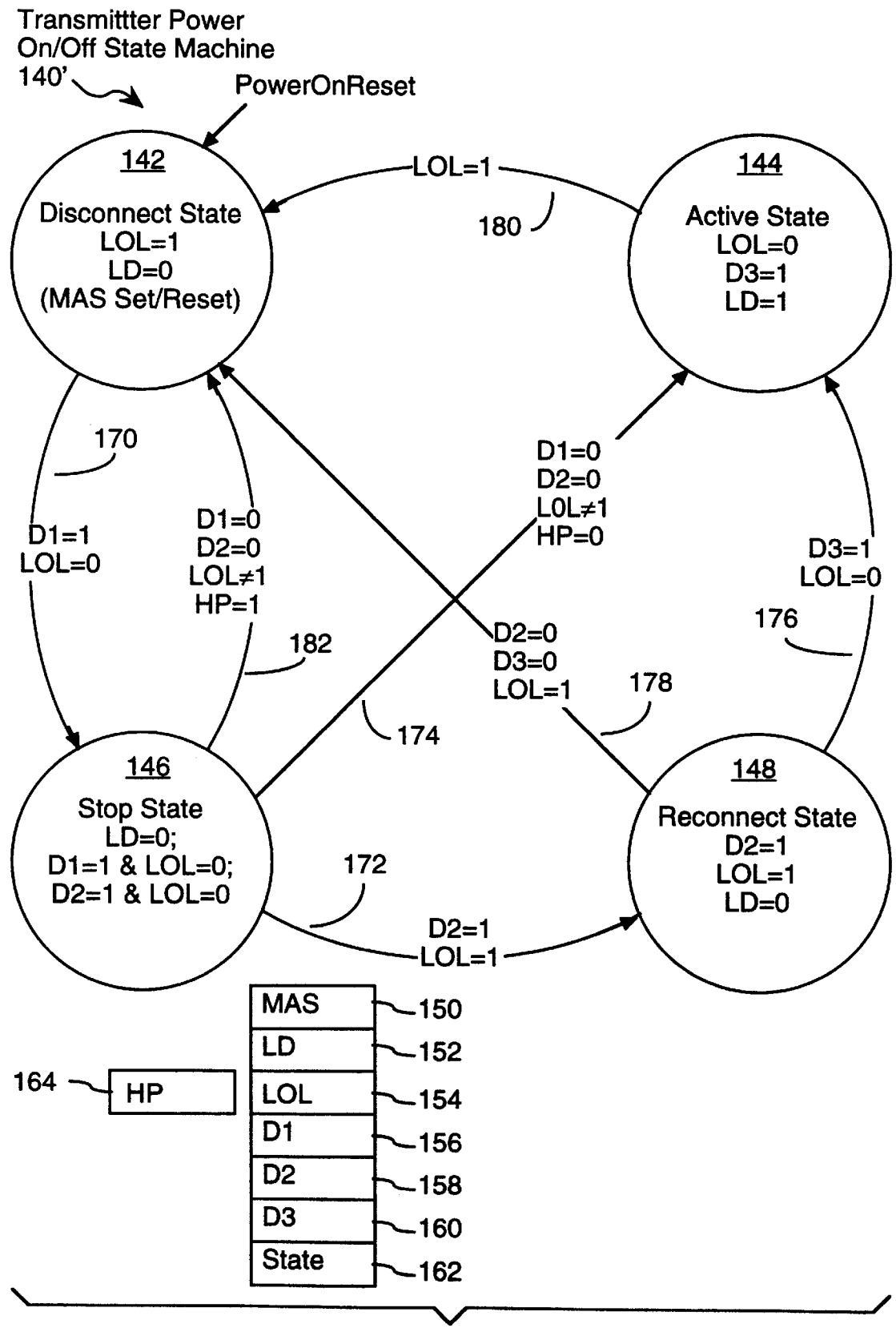
FIG. 5 is a state diagram for the state machine that governs operation of the multi-protocol communication module shown in FIG. 2 in accordance with a first alternate embodiment of the present invention.

Referring to FIG. 5, in a first alternate embodiment, the transceiver's controller 120 checks the power level of the device on the other end of the communication channel 107 when that device is not OFC compliant. If the power level exceeds a safety threshold level, the controller 120 will exit to the Disconnect State 142 and will not enable a communication link with the other device because the other device's laser light transmission level is too high to be safe in the event that the optical fiber carrying laser light from the other device is broken or disconnected from either transceiver.

More specifically, when the controller's state machine 140' is in the Stop State 146 and a loss of light is not detected by the transceiver before the expiration of the Decode 2 time period, the power level of the laser signal received from the other device is measured by the receiver circuit 116. If the measured power of the received laser signal exceeds a predefined safety threshold level (e.g., 0.4 milliwatt), a high power flag HP 164 is asserted (HP=1) and the state machine transitions to the Disconnect State 142 via state transition path 182. If the measured power of the received laser signal does not exceed the predefined safety threshold level, the high power flag HP is deasserted (HP=0) and the state machine transitions to the Active State 144 via state transition path 174.

In this first alternate embodiment, the transceiver of the present invention establishes a communication link only if the device on the other end of the communication channel 107 appears to meet the Safety Class 1 standard.

Figure 6:
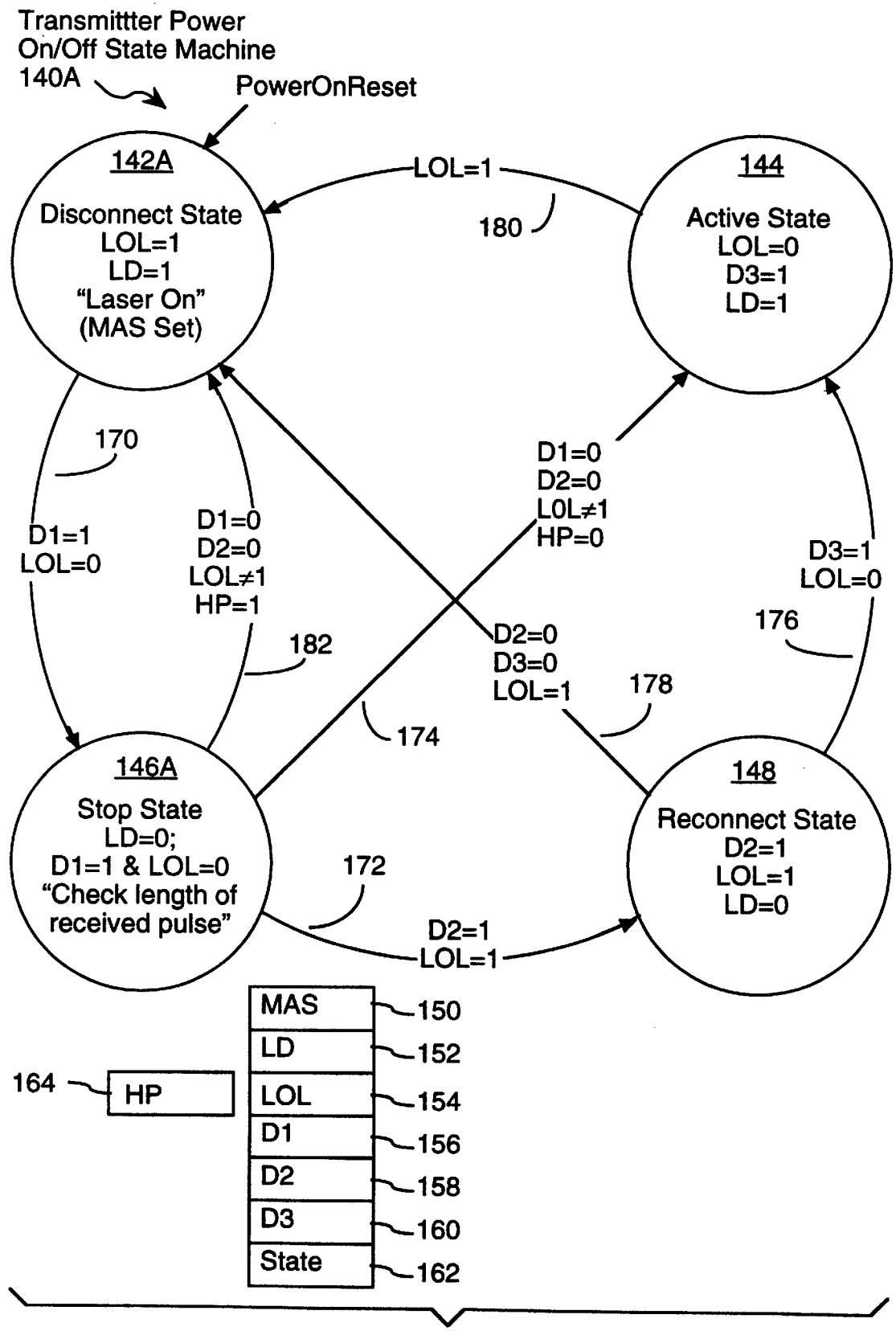
FIG. 6 is a state diagram for the state machine that governs operation of the multi-protocol communication module shown in FIG. 2 in accordance with a second alternate embodiment of the present invention.

Referring to FIG. 6, in a second alternate embodiment of the present invention, the transceiver 102 module attempts to operate as a standard module, and executes the OFC protocol only when it receives an On pulse of predefined duration followed by a loss of light condition. This is the opposite of the transceiver operation in the preferred embodiment in which the transceiver attempts to execute the OFC protocol until it detects that the other device on the other end of the communication channel is a standard transceiver module.

More specifically, the state machine 140A in this second alternate embodiment operates differently in the Disconnect and Stop States than in the preferred and first alternate embodiments. The operation of the Reconnect and Active States remains unchanged. In the Disconnect State 142A the laser transmitter is always on, mimicking the operation of a standard transceiver module, with one exception. In particular, whenever the controller's state machine 140A enters the Disconnect State 142A (e.g., after a power on reset, or after a transition from the Stop, Reconnect or Active states), the controller turns the laser transmitter off for a predefined period, such as one second. This initial turning off of the laser transmitter is important when the device on the other end of the communication channel is an OFC compliant module, because turning off the laser transmitter forces the OFC compliant module to turn off its laser transmitter and to restart the OFC protocol.

The state machine 140A assumes that it will be the master of any connection attempt if the other device is an OFC compliant module, and therefore MAS is asserted (MAS=1) in the Disconnect State. In the event that the device on the other end of the communication channel is an OFC compliant module and that other device decides that it is the master of the connection attempt, the connection attempt may fail. However, during the next connection attempt the other device will operate as the slave of the connection attempt, and that connection attempt should succeed.

The state machine 140A remains in the Disconnect State 142A until light is detected by the laser light receiver (LOL=0).

As soon as the transceiver receives light from the other device it asserts D1=1 and transitions to the Stop State 146A. In the Stop State 146A the controller continues to transmit light on its outgoing optical fiber. In addition, the controller activates a "Stop State timer" having a preselected timeout duration, such as 160 $\mu$s (i.e., just slightly more than the 154 $\mu$s Decode 1 period) in this alternate embodiment, and waits to see if a loss of light condition is detected before the timer expires. If the light signal received from the other device is still on after the timer expires, that indicates the other device is probably a standard transceiver module, and the state machine transitions to the Active State 144 without having ever turned off its laser transmitter.

If a loss of light condition is detected before the Stop State timer expires, that indicates that the other device is probably an OFC compliant module that has just finished transmitting a D1 pulse. In this case the state machine 140A asserts D2=1, turns off its laser transmitter, starts the Decode 2 period, and transitions to the Reconnect State. In the Reconnect State 148 the laser transmitter is kept off for the full Decode 2 period and then the laser transmitter is turned on for at least the Decode 3 period. If the other device is an OFC compliant module executing the slave portion of the OFC protocol, it will transmit laser light back to this transceiver during the Decode 3 period, and the state machine 140A will then transition to the Active State 144.

As with the first alternate embodiment, this version of the state machine 140A may, optionally, check the power level of the received laser light signal when the other device appears to be a standard transceiver module. When this option is implemented, a full duplex connection is established (via a transition 174 from the Stop State 146A to the Active State 144) with a standard transceiver module only when the power level of the received laser light signal is below a predefined safety threshold (e.g., 0.4 milliwatt).

In a third alternate embodiment, the pulse repetition time in the disconnect state is reduced from 10.1 seconds to a shorter time, preferably of 2.0 seconds or less, more preferably 1.0 seconds or less, and most preferably a time period of about 400 milliseconds.

More specifically, in the embodiments of the present invention discussed above with respect to FIGS. 3 and 5, when the state machine 140 or 140' is in the Disconnect state 142, the transceiver successively outputs a light pulse (also variously called a On pulse or D1 pulse or laser pulse) of 154 $\mu$s followed by an off period of duration T. In this third alternate embodiment, the pulse delay period T is most preferably 400 milliseconds, but may range anywhere between 10 milliseconds and 2 seconds, depending on the implementation. If the transceiver receives a light pulse (i.e., LOL=0) while it is sending out a light pulse, the transceiver assumes that it is the OFC sequence master for the interconnection attempt, and proceeds to the Stop State 146 to perform the remainder of the connection protocol described above with reference to FIGS. 3 and 5.

If the transceiver receives a light pulse while it is not sending a light pulse, the transceiver assumes that it is the OFC sequence slave for the interconnection attempt, and proceeds to perform the remainder of the connection protocol described above with reference to FIGS. 3 and 5 by sending out a 154 $\mu$s pulse and transitioning to the Stop State 146.

The connection protocol of the present invention using the shortened D1 pulse delay time (also called the D1 pulse repetition time) is not fully compliant with the OFC specification, however it is nevertheless fully interoperable with OFC compliant devices.

The shortened D1 pulse delay time used in this alternate embodiment results in the establishment of a connection with the other device much faster, on average, than when a 10.1 pulse repetition time is used. Generally, long delays for establishing a fiber optic connection are undesirable when they are not necessary.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A dual optical fiber transceiver, for use with first and second optical fibers, the transceiver comprising:
    a laser transmitter for transmitting laser light into the first optical fiber;
    a laser light receiver for receiving laser light from the second optical fiber; and
    a controller, coupled to the laser transmitter and laser light receiver, for controlling operation of the laser transmitter, the controller including a multi-protocol state machine for establishing a full duplex connection whenever the other device operates in compliance with a predefined "on-off-on" signaling protocol for establishing full duplex connections and for establishing the full duplex connection whenever the other device operates in compliance with a second predefined signaling protocol for establishing full duplex connections; wherein the first and second predefined signaling protocols are mutually incompatible.

2. The transceiver of claim 1, wherein the multi-protocol state machine initially operates in accordance with a predefined one of the predefined "on-off-on" and second predefined signaling protocols and includes logic associated with a predefined state of the state machine for detecting noncompliance of the other device with the predefined one protocol and compliance with the other of the predefined "on-off-on" and second predefined signaling protocols and for making a state transition based on such detection to a state for enabling operation of the transceiver in accordance with the other predefined signaling protocol.

3. The transceiver of claim 1, wherein
    the predefined "on-off-on" signaling protocol is the Open Fiber Control (OFC) protocol and the second predefined signaling protocol is a standard "laser transmitter always on" protocol; and
    the multi-protocol state machine initially operates in accordance the standard protocol and includes logic associated with a predefined state of the state machine for detecting noncompliance of the other device with the standard protocol and potential compliance with the OFC protocol and for making a state transition based on such detection to a state for enabling operation of the transceiver in accordance with the OFC protocol.

4. The transceiver of claim 1, wherein
    the controller, under control of the multi-protocol state machine, repeatedly attempts to establish a full duplex connection with the other device, if any, in accordance with the predefined "on-off-on" signaling protocol, until a laser light signal is received by the laser light receiver;
    the controller, under control of the multi-protocol state machine, after the laser light signal is received by the laser light receiver, waits for a loss of light condition to be detected by the laser light receiver within a predefined time interval;
    the controller, under control of the multi-protocol state machine, continues to follow the predefined "on-off-on" signaling protocol if the loss of light condition is detected by the laser light receiver within the predefined time interval; and
    the controller, as directed by the multi-protocol state machine, transitions to a predefined active state, and enables operation of the laser transmitter, when the loss of light condition is not detected by the laser light receiver within the predefined time interval, thereby establishing a full duplex connection with the other device in accordance with the second signaling protocol.

5. The transceiver of claim 1, wherein
    the controller, under control of the multi-protocol state machine, progresses through a sequence of internal states while establishing a full duplex connection with the other device, if any, including:
        remaining in a Disconnect State when a full duplex connection has not been established, until a first laser light signal is received by the laser light receiver;
        transitioning from the Disconnect State to a Stop State when the first laser light signal is received by the laser light receiver;
        transitioning from the Stop State to a Reconnect State when a loss of light condition is detected by the laser light receiver during a first predefined time interval;
        transitioning from the Reconnect State to an Active State, and enabling operation of the laser transmitter, when the detected loss of light condition is followed by receipt of a second laser light signal by the laser light receiver during a second predefined time interval; and
        transitioning from the Stop State to the Active State, and enabling operation of the laser transmitter, when the loss of light condition is not detected by the laser light receiver during a first predefined time interval, thereby establishing a full duplex connection with the other device in accordance with the second signaling protocol.

6. The transceiver of claim 5, wherein the sequence of internal states through which the controller progresses further includes:
    transitioning from the Stop State to the Disconnect state when a loss of light condition is not detected by the laser light receiver during the first predefined time interval, and the laser light received by the laser light receiver has an associated energy level above a predefined safety threshold.

7. The transceiver of claim 1, wherein the controller includes means for preventing the establishment of a full duplex connection with the other device when the other device operates in compliance with the second predefined signaling protocol and the laser light received by the laser light receiver has an associated energy level above a predefined safety threshold.

8. A method of operating a dual optical fiber transceiver that is coupled to first and second optical fibers, the dual optical fiber transceiver including a laser transmitter for transmitting laser light into the first optical fiber, a laser light receiver for receiving laser light from the second optical fiber, and a controller, coupled to the laser transmitter and laser light receiver, for controlling operation of the laser transmitter and establishing a full duplex connection with another device via the first and second optical fibers, the method comprising the steps of:

establishing the full duplex connection whenever the other device operates in compliance with a predefined "on-off-on" signaling protocol for establishing full duplex connections; and establishing the full duplex connection whenever the other device operates in compliance with a second predefined signaling protocol for establishing full duplex connections;

wherein the predefined "on-off-on" signaling protocol and the second predefined signaling protocol are mutually incompatible.

9. The method of claim 8, including:

initially operating the transceiver in accordance with a predefined one of the predefined "on-off-on" and second predefined signaling protocols, detecting noncompliance of the other device with the predefined one protocol and compliance with the other of the predefined "on-off-on" and second predefined signaling protocols and based on such detection enabling operation of the transceiver in accordance with the other predefined signaling protocol.

10. The method of claim 8, wherein the predefined "on-off-on" signaling protocol is the Open Fiber Control (OFC) protocol and the second predefined signaling protocol is a standard "laser transmitter always on" protocol; and initially operating the transceiver in accordance the standard protocol, detecting noncompliance of the other device with the standard protocol and compliance with the OFC protocol, and based on such detection enabling operation of the transceiver in accordance with the OFC protocol.

11. The method of claim 8, wherein the controller, under control of a multi-protocol state machine, repeatedly attempts to establish a full duplex connection with the other device, if any, in accordance with the predefined "on-off-on" signaling protocol, until a laser light signal is received by the laser light receiver;

the controller, under control of the multi-protocol state machine, after the laser light signal is received by the laser light receiver, waits for a loss of light condition to be detected by the laser light receiver within a predefined time interval;

the controller, under control of the multi-protocol state machine, continues to follow the predefined "on-off-on" signaling protocol if the loss of light condition is detected by the laser light receiver within the predefined time interval; and the controller, as directed by the multi-protocol state machine, transitions to a predefined active state, and enables operation of the laser transmitter, when the loss of light condition is not detected by the laser light receiver within the predefined time interval, thereby establishing a full duplex connection with the other device in accordance with the second signaling protocol.

12. The method of claim 8, wherein the controller, under control of a multi-protocol state machine, performs the steps of:

remaining in a Disconnect State when a full duplex connection has not been established, until a first laser light signal is received by the laser light receiver;

transitioning from the Disconnect State to a Stop State when the first laser light signal is received by the laser light receiver;

transitioning from the Stop State to a Reconnect State when a loss of light condition is detected by the laser light receiver during a first predefined time interval;

transitioning from the Reconnect State to an Active State, and enabling operation of the laser transmitter, when the detected loss of light condition is followed by receipt of a second laser light signal by the laser light receiver during a second predefined time interval; and transitioning from the Stop State to the Active State, and enabling operation of the laser transmitter, when the loss of light condition is not detected by the laser light receiver during a first predefined time interval, thereby establishing a full duplex connection with the other device in accordance with the second signaling protocol.

13. The method of claim 12, wherein the controller, under control of the multi-protocol state machine, performs the additional step of transitioning from the Stop State to the Disconnect state when a loss of light condition is not detected by the laser light receiver during the first predefined time interval, and the laser light received by the laser light receiver has an associated energy level above a predefined safety threshold.

14. The method of claim 8, wherein the controller prevents the establishment of a full duplex connection with the other device when the other device operates in compliance with the second predefined signaling protocol and the laser light received by the laser light receiver has an associated energy level above a predefined safety threshold.

* * * * *